UNITED STATES PATENT OFFICE.

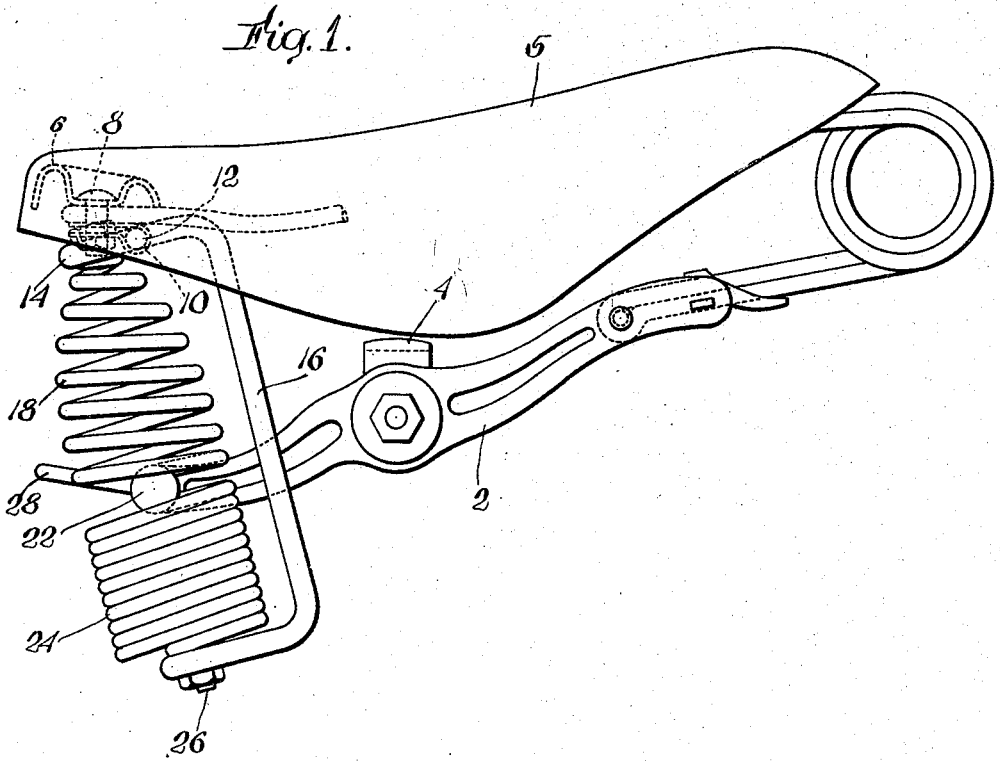
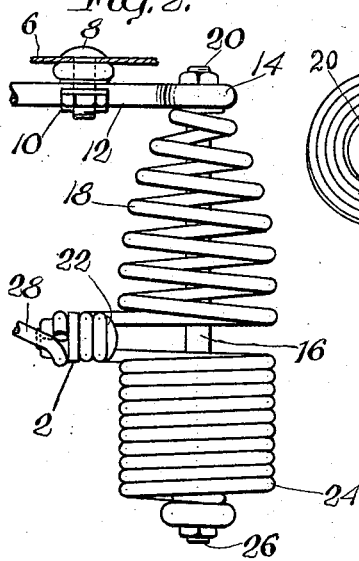
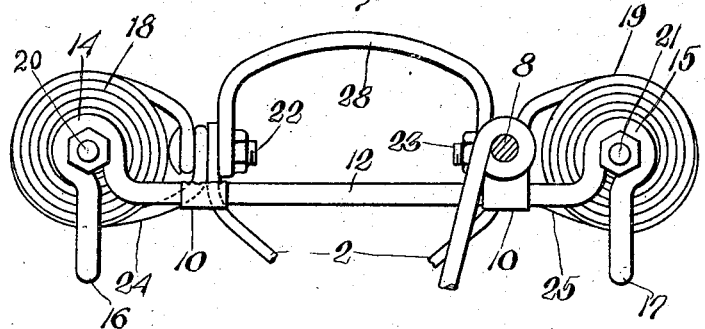

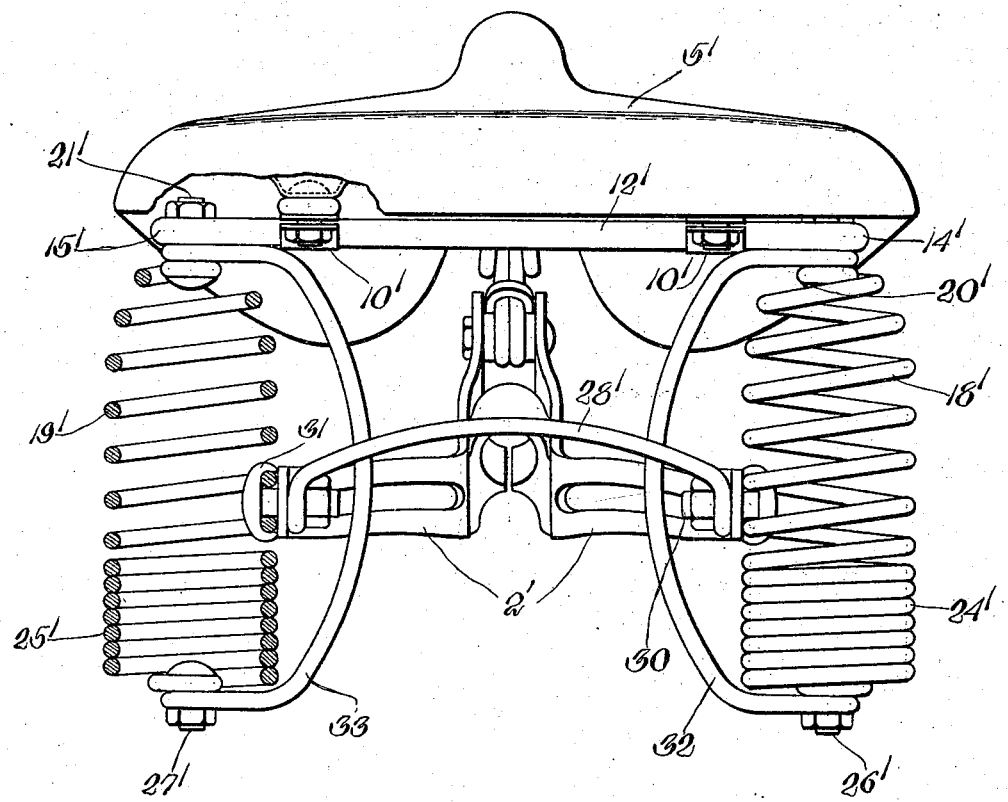

CHARLES A. PERSONS, OF WORCESTER, MASSACHUSETTS.

SADDLE.

1,188,481.  Specification of Letters Patent.  Patented June 27, 1916.

Application filed November 3, 1915. Serial No. 59,378.

*To all whom it may concern:*

Be it known that I, CHARLES A. PERSONS, a citizen of the United States, residing at Worcester, in the county of Worcester and State of Massachusetts, have invented certain Improvements in Saddles, of which the following description, in connection with the accompanying drawings, is a specification, like reference characters on the drawings indicating like parts in the several figures.

This invention relates to saddles of the character used on bicycles and motor cycles and aims to devise an article of this kind which shall be of substantial construction and capable of withstanding hard usage and yet shall have the resiliency and easy riding qualities desired in saddles of this general character.

The invention is particularly concerned with a novel arrangement of springs for a saddle of this type.

The various features of the invention will be readily understood from the following description, reference being made to the accompanying drawings, in which—

Figure 1 is a view in side elevation of a saddle embodying the invention; Fig. 2 is a rear elevation of the right hand pair of springs that support the rear part of the seat portion of the saddle shown in Fig. 1; Fig. 3 is a plan view of the spring mechanism of the saddle shown in Fig. 1, this view being taken just below the cantle plate of the saddle and looking in the direction of the axes of the two pairs of springs; and Fig. 4 is a rear elevation of another embodiment of the invention.

The saddle shown comprises a supporting truss 2 of a form usual in devices of this character which carries a clamp 4 by means of which the saddle is secured to the post of the bicycle or other vehicle on which it is to be used. This truss also supports the springs by which both the rear and pommel portions of the seat 5 are supported. The pommel portion of the seat may be supported in any suitable manner. The rear portion of the seat on which of course most of the weight of the rider comes is carried by a cantle plate 6 of the usual form, this plate being secured by a pair of bolts 8 and two clips or straps 10 to a bridge piece 12 that lies immediately under the cantle plate. This construction is substantially like that shown in my prior Patent No. 1,046,636, granted December 10, 1912.

The bridge piece 12 may consist of a stout wire or small rod having a straight horizontal portion lying under the cantle plate to which the clips 10' are secured and bent at points under the opposite sides of the rear portion of the seat to form eyes 14 and 15, respectively, as clearly shown in Fig. 3. From each of these eyes the rod is curved or bent to form two U-shaped posts 16 and 17, as best shown in Fig. 1.

The cantle plate and consequently the rear portion of the seat is yieldingly supported by means of two pairs of springs which are interposed between the supporting truss 2 and the bridge piece 12 to which the cantle plate is bolted. The right hand pair of springs, as shown in Figs. 1 and 2, comprises a conically wound compression spring 18 having its upper end secured to the eye 14 by a bolt 20 and its lower end secured to one arm of the truss 2 by a bolt 22, and a helical tension spring 24 having its upper end secured to the truss member 2 by the bolt 22 and its lower end secured to the lower end of the post 16 by a bolt 26. The left hand pair of springs comprises a spring 19 like the spring 18 secured to the eye 15 and the truss 2 by bolts 21 and 23, respectively, and a lower spring 25 like the spring 24 which is secured to the truss 2 and the lower end of the post 17 in the same manner that the spring 24 is secured to the truss and the post 16. The compression and tension springs of each pair thus are substantially co-axial, although this arrangement is not absolutely essential in order to secure certain of the advantages of the invention. It will be noted that, as usual in saddles, the truss 2 is bifurcated to form two arms to which the bolts 22 and 23 are secured and these arms are connected by a brace 28, the ends of which are fastened to the arms of the truss by the bolts 22 and 23.

The weight of the rider of course is transmitted to the two pairs of springs through the cantle plate and the bridge piece 12, the pressure on the part 12 being transmitted directly by the eyes 14 and 15 to the compression springs 18 and 19 and to the tension springs 24 and 25 by means of the curved posts 16 and 17. These posts may either be made so that they will be substantially rigid or they may be made of proper dimensions and material to have a spring action. The arrangement shown in Fig. 4 is especially designed to obtain this spring action. In this form of the invention substantially the same general organization has been used as in the arrangement shown in Fig. 1 and the corresponding parts have been designated by primed numerals. The cantle plate is secured to a bridge piece 12' corresponding to the bridge 12 in Figs. 1, 2 and 3, and the part 12' is provided at its opposite ends with eyes 14' and 15' to receive bolts 20' and 21'. In this construction, however, the two springs which constitute each pair are made from a single piece of wire which is openly wound for a distance to form the compression spring and is then closely wound to form the tension spring. At substantially the junction of these two parts the coils are clamped to the respective legs of the truss 2' by means of bolts 30 and 31, respectively, each bolt having a T-shaped head adapted to embrace two adjacent turns of one of the coils. These two pairs of springs act in the same manner as do the corresponding pairs of springs in the form of the invention shown in Figs. 1 to 3. The pairs of springs in this instance, however, are straddled by spring posts 32 and 33, respectively, the upper end of the post 32 being secured to the eye 14' by means of the bolt 20' which also fastens the upper end of the spring 18' to the bridge piece 12' and the lower end of said post being secured to the lower end of the tension spring 24' by the bolt 26'. The spring post 33 is secured to the eye 15' and the spring 25' in a like manner. These two posts 32 and 33 are curved to contribute to their spring action and preferably are so proportioned as to be stronger, that is, to require more force to spring them out of their normal shape than either the tension spring or the compression spring with which they are respectively associated. Preferably also both the tension springs are made stronger than their companion compression springs. Accordingly, under normal conditions the weight of the rider will be resiliently sustained by the action of the two pairs of coiled springs and the posts 32 and 33 will have no substantial spring action; but as the cantle plate is moved downwardly under an increased force, the resistance of the two pairs of coiled springs will increase very rapidly, this being particularly true of the tension springs. If both springs of each pair were compelled to yield together, as would be the case if the posts 32 and 33 or 16 and 17 were made absolutely rigid, resistance of the springs would increase too rapidly to give the easy riding qualities sometimes desired in saddles of this character; but by making the posts 32 and 33 or 16 and 17 so that they will have a spring action, the compression springs are allowed to act somewhat independently of the tension springs; that is, as downward movement of the cantle plate is transmitted to the tension springs through the spring posts both the compression and tension springs will yield together until they counterbalance a given weight on the saddle. A further increase in this weight or a sudden jolt causes the spring posts to yield somewhat, thus allowing this additional shock to be taken up by the compression springs which are the weakest of the three sets of springs. In other words the resistance of the tension springs increases so rapidly that at a certain point this resistance becomes greater than the combined resistance of the spring posts and the compression springs. Consequently at this point the latter springs yield to cushion the shock. At the same time this arrangement affords a very sturdy and substantial construction.

Having thus described my invention, what I claim as new and desire to secure by Letters Patent of the United States is:

1. In a saddle of the character described, the combination with a seat and a cantle plate for said seat, of a supporting truss, two pairs of springs interposed between said truss and cantle plate and operative to support said cantle plate yieldingly, each of said pairs of springs comprising a tension spring and a compression spring arranged one above the other, and additional spring means interposed between said cantle plate and the lower ends of said tension springs.

2. In a saddle of the character described, the combination with a seat and a cantle plate for said seat, of a supporting truss, two springs suspended from said truss, two spring posts lying outside of said springs having their upper ends connected to said cantle plate and their lower ends connected, respectively, to the lower ends of said springs, and additional spring means interposed between said cantle plate and said truss.

3. In a saddle of the character described, the combination with a seat and a cantle plate for said seat, of a supporting truss, two pairs of springs interposed between said truss and cantle plate and operative to support said cantle plate yieldingly, each of said pairs of springs comprising a spring suspended from said truss and another spring mounted above said suspended spring, a single fastening means securing the upper end of each suspended spring and the lower end of its companion spring to said truss, and additional spring means interposed between said cantle plate and the lower ends of said suspended springs through which movement of the cantle plate is transmitted to said suspended springs.

4. In a saddle of the character described, the combination with a supporting truss, a seat and a cantle plate for said seat, of two pairs of springs interposed between said truss and cantle plate, each pair having one spring arranged above the other, a bridge piece secured to said cantle plate and having two eyes formed therein to which the upper ends of the upper springs of each pair are respectively connected, and said bridge piece having two curved posts extending downwardly from said eyes outside of said springs, and means for securing the lower ends of the lower springs of said pairs, respectively, to the lower ends of said posts.

5. In a saddle of the character described, the combination with a supporting truss, a seat and a cantle plate for said seat, of springs interposed between said truss and cantle plate and serving to yieldingly support the seat, a bridge piece secured to said cantle plate and having two eyes formed therein and two posts depending therefrom and lying outside of said springs, and means coöperating with said eyes and posts to secure the springs to said bridge piece.

In testimony whereof I have signed my name to this specification.

CHARLES A. PERSONS.

Copies of this patent may be obtained for five cents each, by addressing the "Commissioner of Patents, Washington, D. C."